United States Patent
Solven et al.

(10) Patent No.: US 9,874,983 B2
(45) Date of Patent: Jan. 23, 2018

(54) ELECTRODE COMBINING FOR NOISE DETERMINATION

(71) Applicant: Synaptics Incorporated, San Jose, CA (US)

(72) Inventors: Derek R. Solven, San Jose, CA (US); Matthew Stevenson, San Jose, CA (US); Robert J. Bolender, San Jose, CA (US); Jonathan Losh, Mountain View, CA (US)

(73) Assignee: Synaptics Incorporated, San Jose, CA (US)

( * ) Notice: Subject to any disclaimer, the term of this patent is extended or adjusted under 35 U.S.C. 154(b) by 211 days.

(21) Appl. No.: 14/748,042

(22) Filed: Jun. 23, 2015

(65) Prior Publication Data

US 2016/0378221 A1    Dec. 29, 2016

(51) Int. Cl.
G06F 3/041    (2006.01)
G06F 3/044    (2006.01)
G06K 9/00    (2006.01)

(52) U.S. Cl.
CPC ............ G06F 3/044 (2013.01); G06F 3/0416 (2013.01); G06K 9/00013 (2013.01); G06F 2203/04111 (2013.01); G06F 2203/04112 (2013.01)

(58) Field of Classification Search
CPC ...... G06F 3/044; G06F 3/0416; G06F 3/0418; G06F 3/0412; G06F 2203/04111; G06F 2203/04104; G06F 3/047; G06F 1/1643; G06F 11/00; G06F 3/041; G06F 2203/04103; G06F 3/045; G06F 2203/04107; G06F 2203/04105; G06F 2203/04112; G06F 3/016

USPC .................................................. 345/173–175
See application file for complete search history.

(56) References Cited

U.S. PATENT DOCUMENTS

| 2011/0279410 | A1* | 11/2011 | Han | G06F 3/044 345/174 |
| 2012/0026131 | A1* | 2/2012 | Bytheway | G06F 3/044 345/174 |
| 2012/0217978 | A1 | 8/2012 | Shen et al. | |
| 2012/0293445 | A1* | 11/2012 | Crandall | G06F 3/044 345/174 |
| 2013/0063388 | A1 | 3/2013 | Ningrat | |
| 2014/0022188 | A1* | 1/2014 | Ahn | G06F 3/0416 345/173 |

(Continued)

OTHER PUBLICATIONS

Patent Cooperation Treaty, International Search Report and Written Opinion for PCT/US2016/035584, dated Aug. 24, 2016.

Primary Examiner — Duc Dinh
(74) Attorney, Agent, or Firm — Osha Liang LLP

(57) ABSTRACT

In a method of capacitive sensing, a first plurality of sensor electrodes of a sensor electrode pattern is coupled, in a first configuration, to input channels of a processing system. The sensor electrode pattern is associated with a sensing region. The first configuration of the first plurality sensor of electrodes is utilized to acquire a measurement of current. A noise environment is determined through analysis of the measurement of current. At least one subset of the first plurality of sensor electrodes is coupled, in a second configuration, to the input channels. The second configuration and the first configuration are different. The second configuration of the first plurality of sensor electrodes is utilized to acquire capacitive resulting signals.

21 Claims, 10 Drawing Sheets

(56) References Cited

U.S. PATENT DOCUMENTS

2014/0132525 A1    5/2014   Pyo et al.
2014/0232684 A1*   8/2014   Mamba ................ G06F 3/0418
                                                           345/174
2014/0300376 A1   10/2014   Philipp et al.

* cited by examiner

500

COUPLING, IN A FIRST CONFIGURATION, A FIRST PLURALITY OF SENSOR ELECTRODES OF A SENSOR ELECTRODE PATTERN TO RECEIVER CHANNELS OF A PROCESSING SYSTEM, WHEREIN THE SENSOR ELECTRODE PATTERN IS ASSOCIATED WITH A SENSING REGION
510

UTILIZING THE FIRST CONFIGURATION OF THE FIRST PLURALITY SENSOR OF ELECTRODES TO ACQUIRE A MEASUREMENT OF CURRENT
520

DETERMINING A NOISE ENVIRONMENT THROUGH ANALYSIS OF THE MEASUREMENT OF CURRENT
530

COUPLING, IN A SECOND CONFIGURATION, A SUBSET OF THE FIRST PLURALITY OF SENSOR ELECTRODES TO THE RECEIVER CHANNELS, WHEREIN THE SECOND CONFIGURATION AND THE FIRST CONFIGURATION ARE DIFFERENT
540

UTILIZING THE SECOND CONFIGURATION OF THE FIRST PLURALITY OF SENSOR ELECTRODES TO ACQUIRE CAPACITIVE RESULTING SIGNALS
550

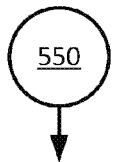

DETERMINING, BASED ON THE CAPACITIVE RESULTING SIGNALS, A POSITION OF AN INPUT OBJECT WITH RESPECT TO THE SENSING REGION
560

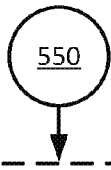

COUPLING A SECOND SUBSET OF THE FIRST PLURALITY OF SENSOR ELECTRODES OF THE SENSOR ELECTRODE PATTERN TO THE INPUT CHANNELS, WHEREIN THE AT LEAST ONE SUBSET OF THE FIRST PLURALITY OF SENSOR ELECTRODES AND THE SECOND SUBSET OF THE FIRST PLURALITY OF SENSOR ELECTRODES SHARE NO COMMON SENSOR ELECTRODES
570

UTILIZING THE SECOND SUBSET TO ACQUIRE SECOND CAPACITIVE RESULTING SIGNALS
575

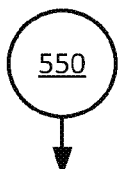

COUPLING, IN A THIRD CONFIGURATION, A SECOND PLURALITY OF SENSOR ELECTRODES OF THE SENSOR ELECTRODE PATTERN TO THE RECEIVER CHANNELS, WHEREIN THE FIRST PLURALITY OF SENSOR ELECTRODES AND THE SECOND PLURALITY OF SENSOR ELECTRODES SHARE NO COMMON SENSOR ELECTRODES
580

UTILIZING THE THIRD CONFIGURATION TO ACQUIRE SECOND CAPACITIVE RESULTING SIGNALS
585

FIG. 5D

ELECTRODE COMBINING FOR NOISE DETERMINATION

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic system.

SUMMARY

In a method of capacitive sensing, a first plurality of sensor electrodes of a sensor electrode pattern is coupled, in a first configuration, to input channels of a processing system. The sensor electrode pattern is associated with a sensing region. The first configuration of the first plurality sensor of electrodes is utilized to acquire a measurement of current. A noise environment is determined through analysis of the measurement of current. At least one subset of the first plurality of sensor electrodes is coupled, in a second configuration, to the input channels. The second configuration and the first configuration are different. The second configuration of the first plurality of sensor electrodes is utilized to acquire capacitive resulting signals. In some embodiments, a position of an input object with respect to the sensing region is determined based on the capacitive resulting signals.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements, and:

FIGS. 5A, 5B, 5C, and 5D illustrate a flow diagram of an example method of capacitive sensing, according to various embodiments.

DESCRIPTION OF EMBODIMENTS

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide input devices, processing systems, and methods that facilitate improved usability. In various embodiments described herein, the input device may be a capacitive sensing input device. Utilizing techniques described herein, efficiencies may be achieved by merging sensor electrodes of a capacitive sensor pattern in various manners in order to measure noise information. That is, a plurality of sensor electrodes may be combined, switched, or otherwise shorted together with one another such that that a single input channel coupled with the merged together sensor electrodes measures the sum of the noise subjected to the plurality of merged together sensor electrodes. In some embodiments, when the number of sensor electrodes in a sensor pattern exceeds the number of input channels such merging together of sensor electrodes can be utilized to more quickly measure noise by allowing noise to be measured in a single input frame rather than taking two or more input frames to measure noise on the same sensor electrodes without the electrode merging. Additionally or alternatively, in some embodiments, the merging allows fewer input channels to be utilized, thus allowing unused input channels to be shut down or placed in a low power mode while noise measurements take place, resulting in a power savings/conservation over using more input channels to accomplish the same measurement of noise.

Discussion begins with a description of an example input device with which or upon which various embodiments described herein may be implemented. An example sensor electrode pattern is then described alone and along with some associated side electrodes. This is followed by description of an example processing system and some components thereof. The processing system may be utilized with or as a portion of an input device, such as a capacitive sensing input device. Several examples of a merger module of a processing system are described, including description of how a merger module may be utilized to merge (i.e., combine, switch, or short together) various pluralities of sensor electrodes for coupling, in groups, to individual input channels of the processing system. Operation of the input devices, processing systems, and components thereof are then further described in conjunction with description of an example method of input (capacitive) sensing.

Example Input Device

Figure 1:
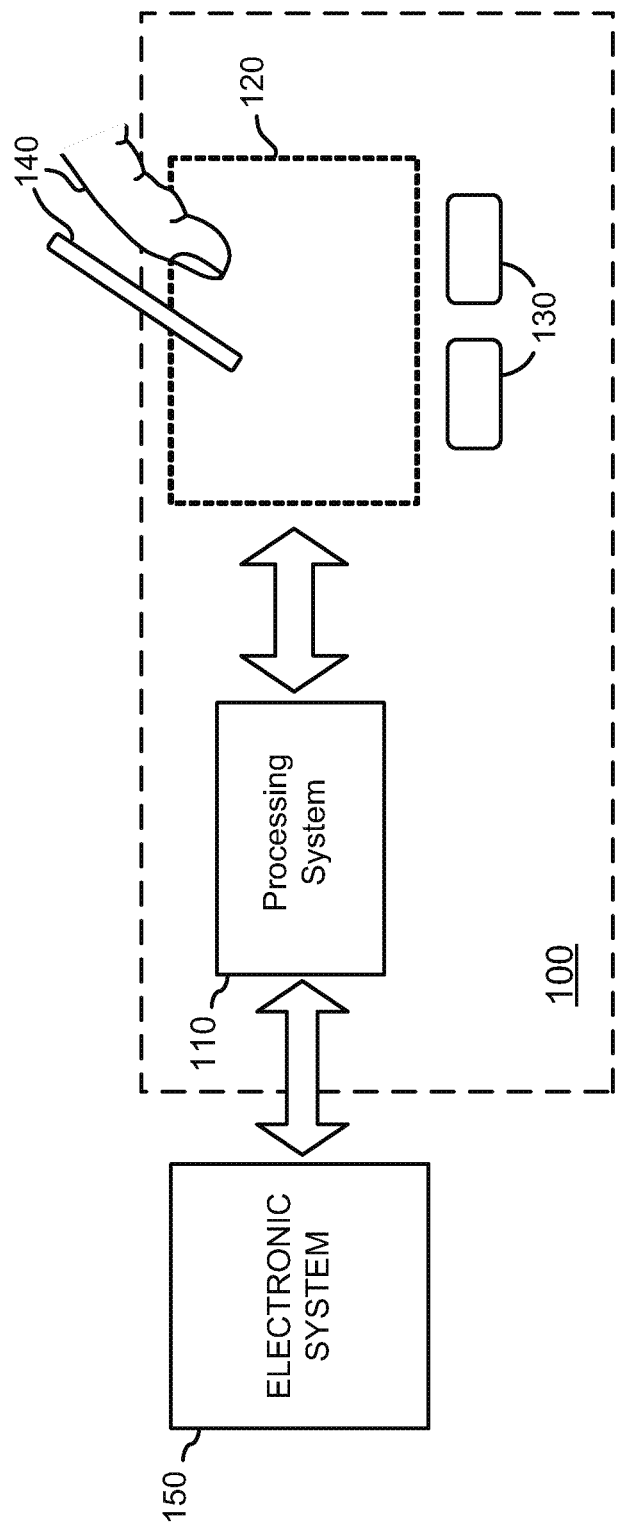
FIG. 1 is a block diagram of an example input device, in accordance with embodiments.

Turning now to the figures, FIG. 1 is a block diagram of an example input device 100, in accordance with various embodiments. Input device 100 may be configured to provide input to an electronic system/device 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of an electronic system 150, or can be physically separate from electronic system 150. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in the sensing region 120. Input device 100 comprises one or more sensing elements for detecting user input. As a non-limiting example, input device 100 may use capacitive techniques for input sensing.

Some implementations are configured to provide images that span one, two, three, or higher dimensional spaces. Some implementations are configured to provide projections of input along particular axes or planes.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In some embodiments, one or more receiver electrodes may be operated to receive a resulting signal when no transmitter electrodes are transmitting (e.g., the transmitters are disabled or no transmitter signal is driven on any sensor electrodes). In this manner, the resulting signal represents noise detected in the operating environment of sensing region 120. In this manner, in some embodiments, the resulting signal represents noise detected in the operating environment of sensing region 120. For example, display noise of a nearby or co-located (e.g., overlapping) display may be represented in the resulting signal that is received during transcapacitive sensing. As is described further below, in various embodiments combinations of sensor electrodes or/or combinations of sensor electrodes and side electrodes may be shorted together and coupled with an input channel so that the sum of the noise subjected to the multiple shorted electrodes is measured simultaneously by the input channel to which the shorted electrodes are coupled.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance (i.e., transcapacitive) sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensing modules configured to operate sensing element(s) or other structures to detect input and determination modules configured to determine positions of any inputs objects detected. For example, a sensing module may perform one or more of absolute capacitive sensing and transcapacitive sensing to detect inputs, and a determination module may determine positions of inputs based on the detected capacitances or changes thereto. In some embodiments, other modules or functionality may be included in processing system 110; for example, an identification module may be included and configured to identify gestures from detected inputs.

In some embodiments, processing system 110 responds to user input (or lack of user input) in sensing region 120 directly by causing one or more actions. Example actions include changing operation modes, as well as Graphic User Interface (GUI) actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. As one example, "zero-dimensional" positional information includes near/far or contact/no contact information. As another example, "one-dimensional" positional information includes positions along an axis. As yet another example, "two-dimensional" positional information includes motions in a plane. As still another example, "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other non-transitory storage technology.

Example Sensor Electrode Pattern

Figure 2A:
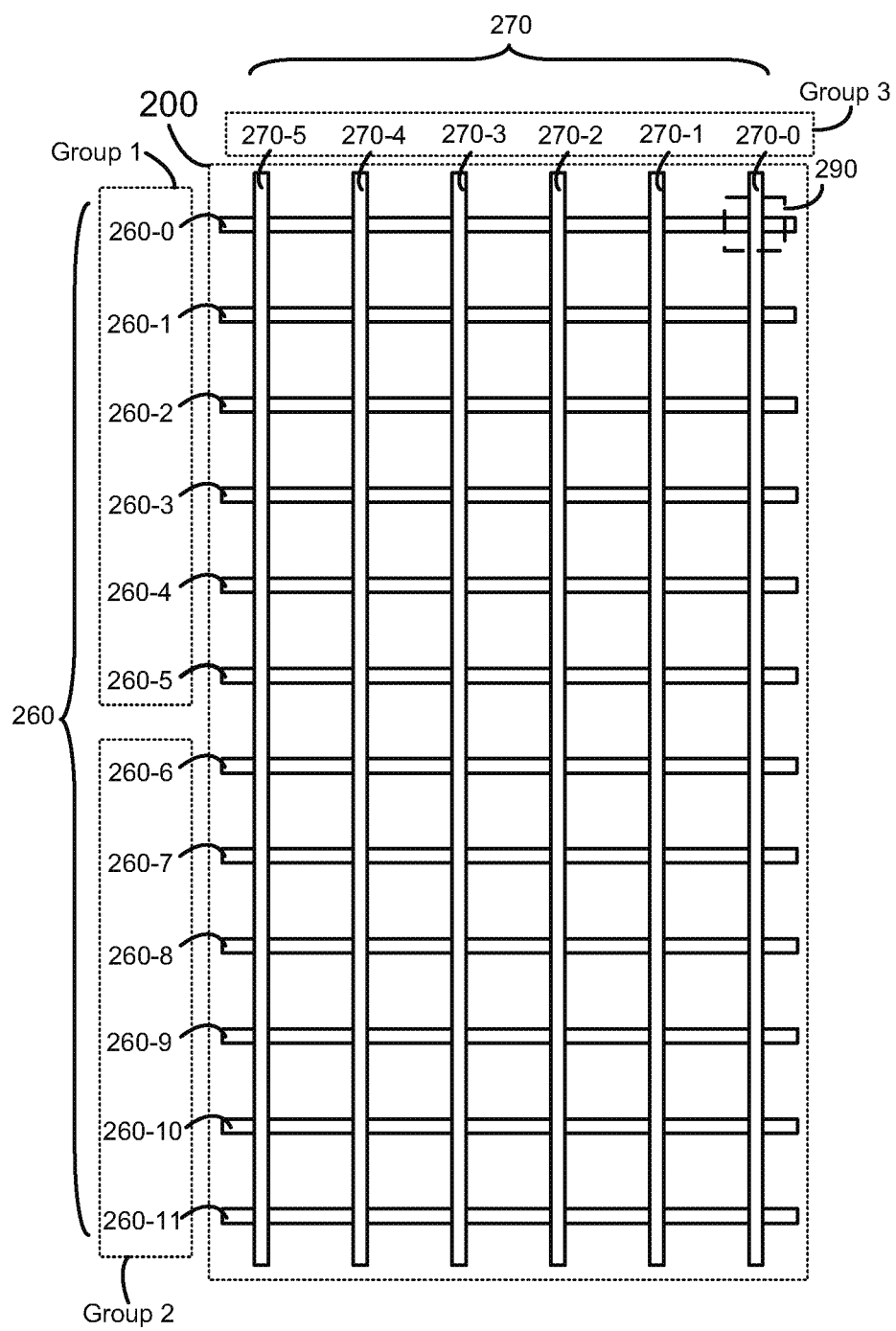
FIG. 2A shows an example sensor electrode pattern which may be utilized in a sensor to generate all or part of the sensing region of an input device, such as a touch screen, according to some embodiments.

FIG. 2A shows a portion of an example sensor electrode pattern 200 which may be utilized in a sensor to generate all or part of the sensing region of input device 100, according to various embodiments. Input device 100 is configured as a capacitive sensing input device when utilized with a capacitive sensor electrode pattern. For purposes of clarity of illustration and description, a non-limiting simple rectangular sensor electrode pattern 200 is illustrated. It is appreciated that a greater or lesser number of sensor electrodes may be utilized in practice than are illustrated in sensor electrode pattern 200. It is also appreciated that numerous other sensor electrode patterns may be employed with the techniques described herein, including but not limited to: patterns with a single sensor electrode; patterns with a single set of sensor electrodes; patterns with two sets of sensor electrodes disposed in a single layer (without overlapping); patterns with two sets of sensor electrodes disposed in a single layer employing jumpers at crossover regions between sensor electrodes; patterns in circular sensing regions; patterns that utilize one or more display electrodes of a display device such as one or more segments of a common voltage ($V_{com}$) electrode; patterns with one or more of source electrodes, gate electrodes, anode electrodes, and cathode electrodes; and patterns that provide individual button electrodes.

The illustrated sensor electrode pattern 200 is made up of a first plurality of sensor electrodes 270 (270-0, 270-1, 270-2, 270-3, 270-4, 270-5) and a second plurality of sensor electrodes 260 (260-0, 260-1, 260-2, 260-3, 260-4, 260-5, 260-6, 260-7, 260-8, 260-9, 260-10, and 260-11) which overlay one another, in this example. As can be seen, sensor electrodes 260 are disposed along a first axis, of a pair of substantially orthogonally disposed axes, which has a greater number of sensor electrodes than a second and substantially orthogonal axis (of the pair of axes) along which sensor electrodes 270 are disposed. As depicted the sensor electrodes are divided into three groups with sensor electrodes 260-0 through 260-5 in Group 1, sensor electrodes 260-6 through 260-11 in Group 2, and sensor electrodes 270-0 through 270-5 in Group 3. In many embodiments, processing system 110 is configured to operate the first plurality of sensor electrodes 270 as transmitter electrodes by driving them with transmitter signals and the second plurality of sensor electrodes 260 as receiver electrodes by receiving resulting signals with them. Other embodiments, may reverse the roles of sensor electrodes 260 and 270. In the illustrated example, sensing pixels are centered at locations where transmitter and receiver electrodes cross. Capacitive pixel 290 illustrates one of the capacitive pixels generated by sensor electrode pattern 200 during transcapacitive sensing. It is appreciated that in a crossing sensor electrode pattern, such as the illustrated example, some form of insulating material or substrate is typically disposed between transmitter electrodes 270 and receiver electrodes 260. However, in some embodiments, transmitter electrodes 270 and receiver electrodes 260 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

When accomplishing transcapacitive measurements, capacitive pixels, such as capacitive pixel 290, are areas of localized capacitive coupling between transmitter electrodes 270 and receiver electrodes 260. The capacitive coupling between transmitter electrodes 270 and receiver electrodes 260 changes with the proximity and motion of input objects in the sensing region associated with transmitter electrodes 270 and receiver electrodes 260.

In some embodiments, sensor electrode pattern 200 is "scanned" to determine these capacitive couplings. That is, the transmitter electrodes 270 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 260 to be independently determined.

The receiver electrodes 260 may be operated singly or multiply to acquire resulting signals. The resulting signals may be used to determine measurements of the capacitive couplings at the capacitive pixels where transmitter electrodes 270 and receiver electrodes 260 cross or interact to measure a transcapacitance.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more sensor electrodes 260 or 270 may be operated to perform absolute capacitive sensing at a particular instance of time. For example, sensor electrode 270-0 may be charged and then the capacitance of sensor electrode 270-0 may be measured. In such an embodiment, an input object 140 interacting with sensor electrode 270-0 alters the electric field near sensor electrode 270-0, thus changing the measured capacitive coupling. In this same manner, a plurality of sensor electrodes 270 may be used to measure absolute capacitance and/or a plurality of sensor electrodes 260 may be used to measure absolute capacitance. It should be appreciated that when performing absolute capacitance measurements the labels of "receiver electrode" and "transmitter electrode" lose the significance that they have in transcapacitive measurement techniques, and instead a sensor electrode 260 or 270 may simply be referred to as a "sensor electrode" or may continue to use its designation as a transmitter electrode or a receiver electrode even though they are used in the same manner during absolute capacitive sensing.

Background capacitance, $C_B$, is the capacitive image of a sensor pattern or the absolute capacitance measured on a sensor electrode with no input object in the sensing region of a sensor electrode pattern. The background capacitance changes with the environment and operating conditions.

Capacitive images and absolute capacitance measurements can be adjusted for the background capacitance of the sensor device for more efficient processing. For example, various techniques may be employed internal and/or external to an ASIC/processing system to subtract/offset some amount of the baseline capacitance that is known to be present in an absolute capacitive measurement. In absolute capacitive sensing, such charge offsetting improves the dynamic range of an amplifier of the ASIC/processing system that is used to amplify a signal which includes an input object related component on top of the baseline absolute capacitance signal measurement. This is because the component of the signal attributed to presence of an input object can be more greatly amplified (without amplifier saturation) if some of the baseline portion is removed by internal offsetting.

Many techniques for internal offset (internal to the ASIC/processing system) of a baseline charge are known in the art and include utilizing an offsetting capacitance in parallel with a feedback capacitor of the amplifier and/or injecting charge to an input of the amplifier that is also coupled with the sensor from which an absolute capacitance is being measured.

In some embodiments, using techniques herein, one or more portions of a printed circuit (e.g., a flexible printed circuit, a printed circuit board, a lithographically printed circuit, or other type of printed circuit) that includes routing traces used to couple sensing signals to and/or from sensors in a sensing region of a sensing device can be used to offset some amount of the baseline capacitance measured during absolute capacitive sensing. This type of charge offsetting is accomplished external to the ASIC/processing system. It should be appreciated that any of the external charge offsetting techniques described herein may be utilized alone or may be used in combination with one or more internal charge offsetting techniques.

Figure 2B:
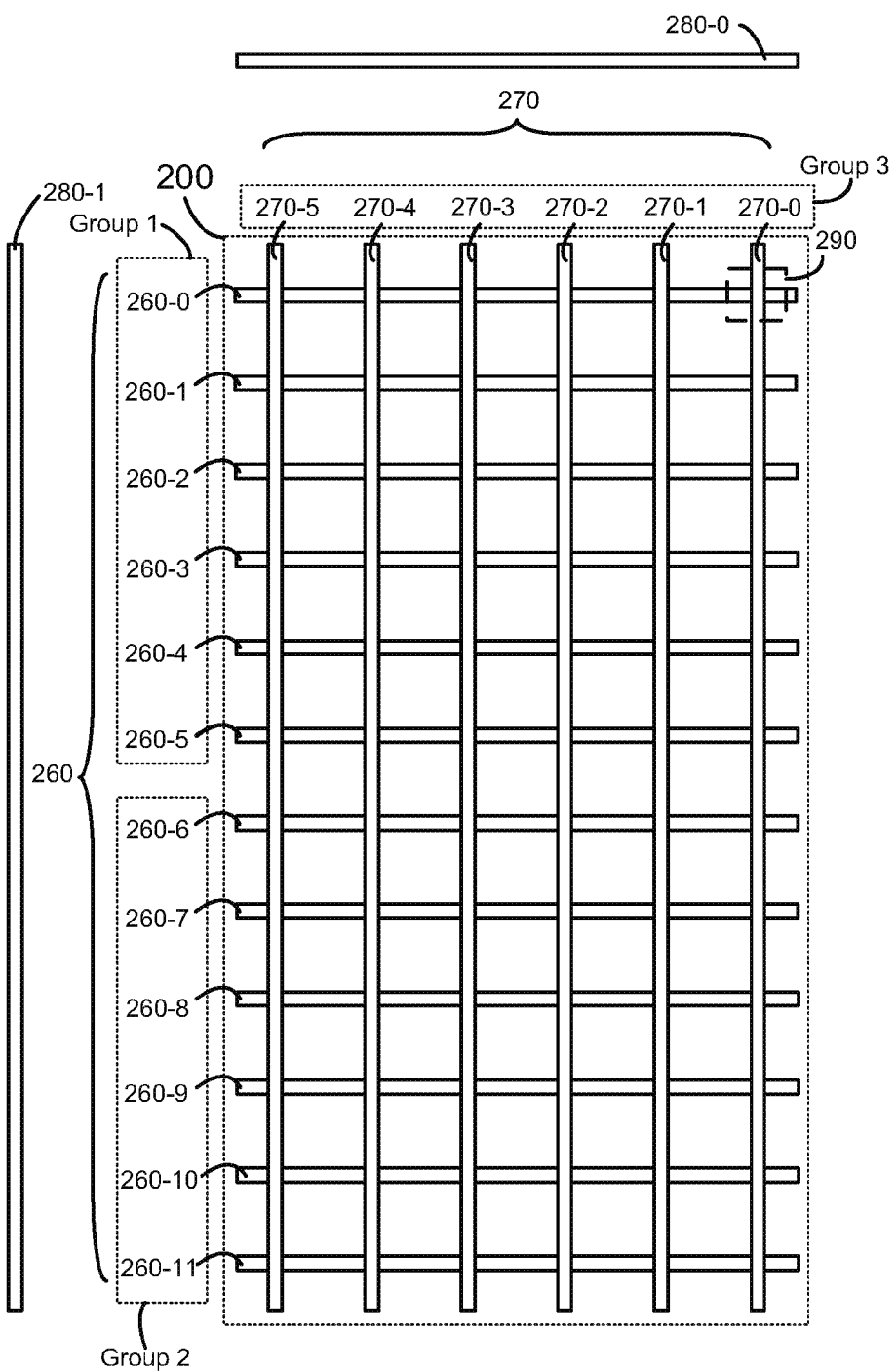
FIG. 2B shows some associated example side electrodes along with the example sensor electrode pattern of FIG. 2A, according to some embodiments.

FIG. 2B shows some associated example side electrodes 280 (280-0 and 280-1) along with the example sensor electrode pattern 200 of FIG. 2A, according to some embodiments. Side electrodes 280 are examples of sensor electrodes that are outside sensor electrode pattern 200 and its sensing region. In various embodiments a side electrode such as 280-0 or 280-1 may be a ground electrode, a guard electrode, a shield electrode, or other electrode that is not used for capacitive sensing. A side electrode such as 280-0 or 280-1 may also be a capacitive sensing electrode that is associated with a button, slider, or other capacitive sensor disposed apart from sensor electrode pattern 200 (e.g., on the grip edge of an electronic device). In some embodiments, side electrodes 280 may be placed on the side of a device where a user may grip the device. In other embodiments, side electrodes 280 may be located elsewhere on the devices, but in a different region than the sensor electrodes comprising sensing region 120. As will be described herein, in some embodiments, one or more side electrodes 280 may be coupled to an input channel of a processing system 100 and utilized in the measurement of noise in the vicinity of a capacitive sensing pattern such as sensor electrode pattern 200. Additionally, in some embodiments, side electrodes 280-0 and 280-1 may each comprise multiple sensor electrodes.

Example Processing System

Figure 3:
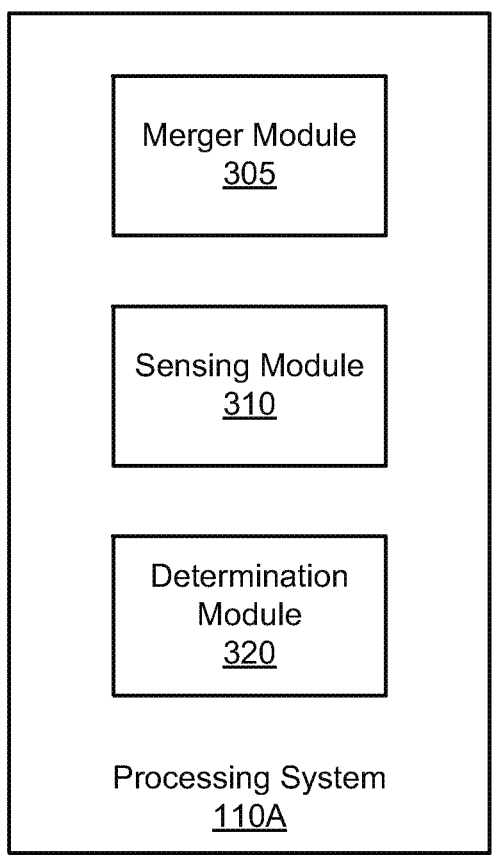
FIG. 3 illustrates a block diagram of some components of an example processing system, according to some embodiments.

FIG. 3 illustrates a block diagram of some components of an example processing system 110A that may be utilized with an input device (e.g., in place of processing system 110 as part of input device 100), according to various embodiments. As described herein, input device 100 is a capacitive sensing input device. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more transmitter electrode(s) and receiver electrode(s) that implement a sensing region 120 of an input device 100. In some embodiments, processing system 110A and the input device 100 of which it is a part may be disposed in or communicatively coupled with an electronic system 150, such as a display device, computer, or other electronic system.

In one embodiment, processing system 110A includes, among other components: a merger module 305, a sensing module 310, and a determination module 320. Processing system 110A and/or components thereof may be coupled with sensor electrodes of a sensor electrode pattern, such as sensor electrode pattern 200, among others.

In various embodiments, merger module 305 is configured to selectively couple sensor electrodes and/or other electrodes to input channels of processing system 110A. During input sensing, merger module 305 operates, in some embodiments, to selectively couple only a single sensor electrode (e.g., a sensor electrode 260 or 270) to any input channel of processing system 110A. During noise measurement, merger module 305 may operate in a variety of ways to: selectively couple only a single sensor electrode (e.g., a sensor electrode 260 or 270) to an input channel of processing system 110A; selectively couple (i.e., merge together) a plurality of sensor electrodes (e.g., sensor electrodes 260 and/or 270) to an input channel of processing system 110A; and/or selectively couple (i.e., merge together) a combination of sensor electrodes, side electrodes (e.g., sensor electrodes 260 and/or 270 and side electrodes 280), or other electrodes to an input channel of processing system 110A. For example, during noise measurement, merger module 305 may couple a first plurality of sensor electrodes to input channels of processing system 110A in a first configuration for acquiring a measurement of current (i.e., for noise measurement when no signals are being transmitted on any sensor electrodes). Merger module 305 may then couple at least one subset of the first plurality of sensor electrodes to the same input channels in a second configuration for acquiring capacitive resulting signals (i.e., for input object sensing). In some embodiments, the merger module 305 may selectively couple a combination of at least receiver and transmitter electrodes.

In various embodiments, sensing module 310 comprises a plurality of input channels (see e.g., input channels 415 of FIGS. 4A-4C) and sensor circuitry for providing signals to and receiving inputs from a sensor electrode pattern. Sensing module 310 operates to interact with the sensor electrodes, of a sensor electrode pattern, that are utilized to generate a sensing region 120. This includes operating a first plurality of sensor electrodes (e.g., sensor electrodes 260) to be silent, to be driven with a transmitter signal, to be used for transcapacitive sensing, and/or to be used for absolute capacitive sensing. This also includes operating a second plurality of sensor electrodes (e.g., sensor electrodes 270) to be silent, to be driven with a transmitter signal, to be used for transcapacitive sensing, and/or to be used for absolute capacitive sensing. Sensing module 310 may also interact with one or more side electrodes in an input device that includes a sensor electrode pattern to which sensing module 310 is coupled. In some embodiments, merger module 305 may merge together electrodes for noise sensing, but not for capacitive sensing.

Sensing module 310 is configured to acquire a measurement of current by operating a first plurality of sensor electrodes of a sensor electrode pattern (e.g., sensor electrode pattern 200) of a capacitive sensing device (e.g., input device 100) to receive noise signal. To receive noise signals in the environment of the sensor electrode pattern, sensing module 310 does not transmit signals on any sensor electrodes of the sensor electrode pattern, and instead effectively utilizes one or more selected sensor electrodes of the sensor electrode pattern as antennas that receive or couple to noise in the environment of the sensor electrodes. The noise induces currents onto the sensor electrodes which can be measured by the same circuits utilized by sensing module 310 to measure resulting signals to detect changes in capacitance. Because parallel currents sum with each other, one or more sensor electrodes and/or side electrodes can be merged on to a single input channel during a period of time that noise signals are being received on one or more input channels of sensing module 310. In some embodiments, this period of time may be around a microsecond, though it may be shorter, such as 0.25 microseconds, or longer, such as 7 microseconds. During a different period of time from the receipt of noise signals, sensing module 310 acquires capacitive resulting signals by operating one or more sensor electrodes of a sensor electrode pattern for capacitive sensing. Acquisition of capacitive resulting signals is detailed further below.

Sensing module 310 is configured to acquire transcapacitive resulting signals by transmitting with a first one of a plurality of sensor electrodes of the input device and receiving with a second one of the plurality of sensor electrodes. During transcapacitive sensing, sensing module 310 operates to drive (i.e., transmit) transmitter signals on one or more sensor electrodes of a first plurality of sensor electrodes (e.g., one or more of transmitter electrodes 270). A transmitter signal may be a square wave, trapezoidal wave, or some other waveform. In a given time interval, sensing module 310 may drive or not drive a transmitter signal (waveform) on one or more of the plurality of sensor electrodes. Sensing module 310 may also be utilized to couple one or more of the first plurality of sensor electrodes to high impedance, ground, to an input channel, or to a constant voltage when not driving a transmitter signal on such sensor electrodes. In some embodiments, when performing transcapacitive sensing, sensing module 310 drives two or more transmitter electrodes of a sensor electrode pattern at one time. When driving two or more sensor electrodes of a sensor electrode pattern at once, the transmitter signals may be coded according to a code. For noise avoidance or other reasons, the code may be altered, such as lengthening or shortening the code. Sensing module 310 also operates to receive resulting signals, via a second plurality of sensor electrodes (e.g., one or more of receiver electrodes 260) during transcapacitive sensing. During transcapacitive sensing, received resulting signals correspond to and include effects corresponding to the transmitter signal(s) transmitted via the first plurality of sensor electrodes. These transmitted transmitter signals may be altered or changed in the resulting signal due to presence of an input object, stray capacitance, noise, interference, and/or circuit imperfections among other factors, and thus may differ slightly or greatly from their transmitted versions. It is appreciated that sensing module 310 may, in a similar fashion, transmit transmitter signals on one or more of sensor electrodes 260 and receive corresponding resulting signals on one or more of sensor electrodes 270.

In absolute capacitive sensing, a sensor electrode is both driven and used to receive a resulting signal that results from the signal driven on to the sensor electrode. In this manner, during absolute capacitive sensing, sensing module 310 operates to drive (i.e., transmit) a signal on to and receive a signal from one or more of sensor electrodes 260 or 270. During absolute capacitive sensing, the driven signal may be referred to as an absolute capacitive sensing signal, transmitter signal, or modulated signal, and it is driven through a routing trace that provides a communicative coupling between processing system 110A and the sensor electrode(s) with which absolute capacitive sensing is being conducted.

In various embodiments, sensing module 310 includes one or more amplifiers. Such an amplifier may be interchangeably referred to as an "amplifier," a "front-end amplifier," a "receiver," an "integrating amplifier," a "differential amplifier," or the like, and operates to receive a resulting signal at an input and provide an integrated voltage as an output. The resulting signal is from one or more sensor electrodes of a sensor electrode pattern, such as sensor electrode pattern 200. A single amplifier may be coupled with and used to receive a resulting signal from exclusively from a single sensor electrode, may receive signals from multiple sensor electrodes that are simultaneously coupled with the amplifier, or may receive signals from a plurality of sensor electrodes that are coupled one at a time to the amplifier. A sensing module 310 may include multiple amplifiers utilized in any of these manners. For example, in some embodiments, a first amplifier may be coupled with a first sensor electrode while a second amplifier is coupled with a second sensor electrode.

Determination module 320 may be implemented as hardware (e.g., hardware logic and/or other circuitry) and/or as a combination of hardware and instructions stored in a non-transitory manner in a computer readable storage medium.

Determination module 320 is configured to determine a noise environment of a capacitive sensing input device (e.g., input device 100) through analysis of the measurement of current acquired by sensing module 310 during noise measurement. For example, a higher level of current is indicative of a higher noise environment. Logic of processing system 110A may adjust aspects of capacitive sensing performed by sensing module 310 when a measured level of passes a preset threshold indicative of a high noise environment. For example, capacitive sensing frequency (of a driven transmitter signal) may be changed once or more often to avoid the impact of noise on sensing an input object; sensing may be changed from transcapacitive to absolute capacitive sensing (or vice-a-versa); and/or additional noise sensing and characterization may be employed. Logic of processing system 110A may additionally or alternatively implement algorithms in determination module 320 to perform additional processing and/or filtering of received resulting signals when measured currents exceed some preset threshold indicative of a high noise environment. For example firmware noise mitigation techniques may be enabled and performed as part of a noise state machine. In an example embodiment, the noise state machine can configure the input channels 415 to operate in a high-noise mode in response to an interference metric satisfying a particular threshold. In a high-noise mode, the sensing cycle can be lengthened (i.e., longer integration of the resulting signals), the length of the acquisition bursts can be increased (i.e., each measurement is combined from more sensing cycles), and/or the determination module 320 can invoke one or more noise mitigation algorithms on the measurements. Other types of known noise mitigation techniques can be employed based on the interference metric. In another example, a noise state machine of determination module 320 can trigger a spectral analysis in order to identify a new sensing frequency in response to the interference metric satisfying a particular threshold.

As detailed further below, determination module 320 is also configured to determine positional information for an input object in a sensing region of a capacitive sensing input device (e.g., device 100) based on received capacitive resulting signals.

Determination module 320 operates to compute/determine a measurement of a change in a transcapacitive coupling between a first and second sensor electrode during transcapacitive sensing. Determination module 320 then uses such measurements to determine the positional information comprising the position of an input object (if any) with respect to sensing region 120. The positional information can be determined from a transcapacitive image. The transcapacitive image is determined by determination module 320 based upon resulting signals acquired by sensing module 310. The resulting signals are used as or form capacitive pixels representative of input(s) relative to sensing region 120. It is appreciated that determination module 320 operates to decode and reassemble coded resulting signals to construct a transcapacitive image from a transcapacitive scan of a plurality of sensor electrodes.

In embodiments where absolute capacitive sensing is performed with sensor electrodes 260 and/or 270, determination module 320 also operates to compute/determine a measurement of absolute capacitive coupling to a sensor electrode. For example, determination module 320 operates to determine an absolute capacitance of the sensor electrode (e.g., sensor electrode 270-0) after a sensing signal has been driven on the sensor electrode. It should be noted that processing system 110A may, in some embodiments, compute an absolute capacitive image by combining (e.g., through multiplication, addition, or other means) absolute capacitive profiles measured along at least two different axes of a sensing region. With reference to FIG. 2A as an example, in some embodiments, determination module 320 creates an absolute capacitive image by combining a first absolute capacitive profile acquired with sensor electrodes 260 with a second absolute capacitive profile acquired with sensor electrodes 270. Determination module 320 then uses such measurements to determine the positional information comprising the position of an input object (if any) with respect to sensing region 120. The positional information can be determined from, for example, an absolute capacitive image or from absolute capacitive profiles.

In some embodiments, determination module 320 may utilize measurements (i.e., resulting signals) obtained from both absolute capacitive sensing and transcapacitive sensing (instead of using measurements from just one type of these types capacitive sensing) in determining a position of an input object relative to sensing region 120. This is sometimes referred to as hybrid capacitive sensing. Determination module 320 then uses such measurements to determine the positional information comprising the position of an input object (if any) with respect to sensing region 120. The positional information can be determined from a hybrid capacitive image.

In some embodiments, processing system 110A comprises decision making logic which directs one or more portions of processing system 110A, such as merger module 305, sensing module 310, and/or determination module 320, to operate in a selected one of a plurality of different operating modes based on various inputs.

Figure 4A:
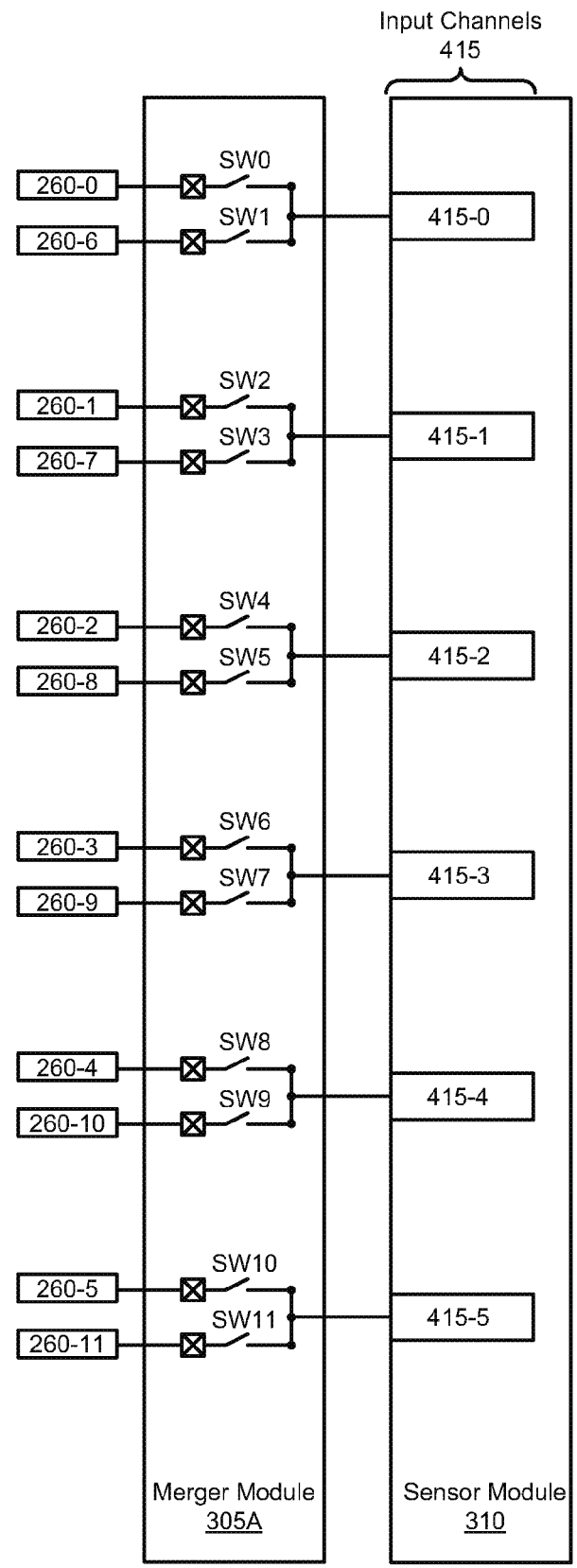
FIG. 4A illustrates a block diagram of a merger module of a processing system that is configured for coupling a sensor electrode pattern with input channels of the processing system, according to various embodiments.

FIG. 4A illustrates a block diagram of a merger module 305A of a processing system 110A that is configured for coupling a sensor electrode pattern 200 with input channels 415 (415-0, 415-1, 415-2, 415-3, 415-4, 415-5) of the processing system, according to various embodiments.

With reference to FIG. 2A and to FIG. 4A, during at least one noise measurement time period, merger module 305A couples a first plurality of sensor electrodes (e.g., sensor electrodes 260) to one or more input channels 415 of sensing module 310 in a first configuration for acquiring currents for noise measurement. To accomplish this first configuration, merger module 305A: closes switches SW0 and SW1 to respectively merge together and simultaneously couple sensor electrodes 260-0 and 260-6 with input channel 415-0; closes switches SW2 and SW3 to respectively merge together and simultaneously couple sensor electrodes 260-1 and 260-7 with input channel 415-1; closes switches SW4 and SW5 to respectively merge together and simultaneously couple sensor electrodes 260-2 and 260-8 with input channel 415-2; closes switches SW6 and SW7 to respectively merge together and simultaneously couple sensor electrodes 260-3 and 260-9 with input channel 415-3; closes switches SW8 and SW9 to respectively merge together and simultaneously couple sensor electrodes 260-4 and 260-10 with input channel 415-4; and closes switches SW10 and SW11 to respectively merge together and simultaneously couple sensor electrodes 260-5 and 260-11 with input channel 415-5. In this manner, sensor electrodes from Group 1 and Group 2 are merged together so currents can be measured on all of the sensor electrodes from Groups 1 and 2 during a single noise measurement time period rather that utilizing two noise sensing time periods if only one sensor electrode had been coupled to an input channel at a time during noise measurement.

With continued reference to FIG. 2A and to FIG. 4A, in some embodiments, during a first capacitance measurement time period, merger module 305A couples a first subset of the first plurality of sensor electrodes (e.g., sensor electrodes 260) to the input channels 415 in a second configuration for acquiring capacitive resulting signals. To accomplish this, merger module 305A: closes SW0 and opens SW1 to couple sensor electrode 260-0 with input channel 415-0; closes SW2 and opens SW3 to couple sensor electrode 260-1 with input channel 415-1; closes SW4 and opens SW5 to couple sensor electrode 260-2 with input channel 415-2; closes SW6 and opens SW7 to couple sensor electrode 260-3 with input channel 415-3; closes SW8 and opens SW9 to couple sensor electrode 260-4 with input channel 415-4; and closes SW10 and opens SW11 to couple sensor electrode 260-5 with input channel 415-5. In this manner, sensor electrodes from Group 1 are each individually coupled with a single input channel so that resulting signals can be acquired from all of the sensor electrodes of Group 1 during a single capacitance measurement time period. The resulting signals may be the result of one or more of absolute capacitive sensing and transcapacitive sensing. Resulting signals acquired during this first capacitance measurement time period are utilized by determination module 320 to determine positional information for an input object in a sensing region (associated with sensor electrode pattern 200) of capacitive sensing input device 100.

With continued reference to FIG. 2A and to FIG. 4A, in some embodiments, during a second capacitance measurement time period that does not overlap with the first capacitance measurement time period, merger module 305A couples a second subset of the first plurality of sensor electrodes (e.g., sensor electrodes 260) to the input channels 415 in a third configuration for acquiring capacitive resulting signals. In one embodiment, there are no common sensor electrodes in the second and third configurations. To accomplish this, merger module 305A: closes SW1 and opens SW0 to couple sensor electrode 260-6 input channel 415-0; closes SW3 and opens SW2 to couple sensor electrode 260-7 with input channel 415-1; closes SW5 and opens SW4 to couple sensor electrode 260-8 with input channel 415-2; closes SW7 and opens SW6 to couple sensor electrode 260-9 with input channel 415-3; closes SW9 and opens SW8 to couple sensor electrode 260-10 with input channel 415-4; and closes SW11 and opens SW10 to couple sensor electrode 260-11 with input channel 415-5. In this manner, sensor electrodes from Group 2 are each individually coupled with a single input channel so that resulting signals can be acquired from all of the sensor electrodes of Group 2 during a single capacitance measurement time period. The resulting signals may be the result of one or more of absolute capacitive sensing and transcapacitive sensing. Resulting signals acquired during this second capacitance measurement time period are utilized by determination module 320 to determine positional information for an input object in a sensing region (associated with sensor electrode pattern 200) of capacitive sensing input device 100. In some embodiments, determination module 320 utilizes resulting signals from the first and second capacitance measurement time periods to determine the position information.

Figure 4B:
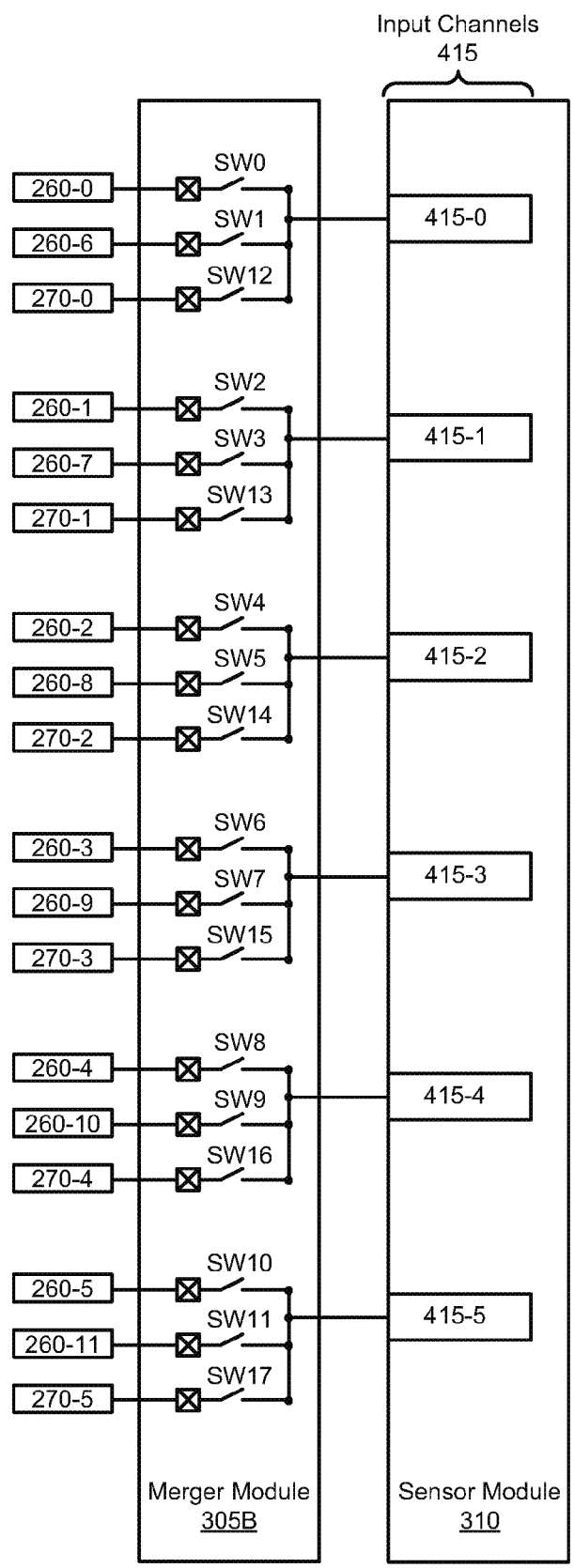
FIG. 4B illustrates a block diagram of a merger module of a processing system that is configured for coupling a sensor electrode pattern with input channels of the processing system, according to various embodiments.

FIG. 4B illustrates a block diagram of a merger module 305B of a processing system 110A that is configured for coupling a sensor electrode pattern 200 with input channels 415 (415-0, 415-1, 415-2, 415-3, 415-4, 415-5) of the processing system, according to various embodiments.

With reference to FIG. 2A and to FIG. 4B, during at least one noise measurement time period, merger module 305B couples a first plurality of sensor electrodes (e.g., sensor electrodes 260) to one or more input channels 415 of sensing module 310 in a first configuration for acquiring currents for the measurement of noise. To accomplish this first configuration, merger module 305B: closes switches SW0 and SW1 to respectively merge together and simultaneously couple sensor electrodes 260-0 and 260-6 with input channel 415-0; closes switches SW2 and SW3 to respectively merge together and simultaneously couple sensor electrodes 260-1 and 260-7 with input channel 415-1; closes switches SW4 and SW5 to respectively merge together and simultaneously couple sensor electrodes 260-2 and 260-8 with input channel 415-2; closes switches SW6 and SW7 to respectively merge together and simultaneously couple sensor electrodes 260-3 and 260-9 with input channel 415-3; closes switches SW8 and SW9 to respectively merge together and simultaneously couple sensor electrodes 260-4 and 260-10 with input channel 415-4; closes switches SW10 and SW11 to respectively merge together and simultaneously couple sensor electrodes 260-5 and 260-11 with input channel 415-5; and opens switches SW12, SW13, SW14, SW15, SW16, and SW17. In this manner, sensor electrodes from Group 3 are not coupled with any input channels 415 while sensor electrodes from Group 1 and Group 2 are merged together so currents can be measured on all of the sensor electrodes from Groups 1 and 2 during a single noise measurement time period rather that utilizing two noise sensing time periods if only one sensor electrode had been coupled to an input channel at a time during noise measurement.

With continued reference to FIG. 2A and to FIG. 4B, in some embodiments, during a first capacitance measurement time period, merger module 305B couples a first subset of the first plurality of sensor electrodes (e.g., sensor electrodes 260) to the input channels 415 in a second configuration for acquiring capacitive resulting signals. To accomplish this, merger module 305B: opens switches SW12, SW13, SW14, SW15, SW16, and SW17; closes SW0 and opens SW1 to couple sensor electrode 260-0 input with channel 415-0; closes SW2 and opens SW3 to couple sensor electrode 260-1 with input channel 415-1; closes SW4 and opens SW5 to couple sensor electrode 260-2 with input channel 415-2; closes SW6 and opens SW7 to couple sensor electrode 260-3 with input channel 415-3; closes SW8 and opens SW9 to couple sensor electrode 260-4 with input channel 415-4; and closes SW10 and opens SW11 to couple sensor electrode 260-5 with input channel 415-5. In this manner, sensor electrodes from Group 1 are each individually coupled with a single input channel so that resulting signals can be acquired from all of the sensor electrodes of Group 1 during a single capacitance measurement time period. The resulting signals may be the result of one or more of absolute capacitive sensing and transcapacitive sensing. Resulting signals acquired during this first capacitance measurement time period are utilized by determination module 320 to determine positional information for an input object in a sensing region (associated with sensor electrode pattern 200) of capacitive sensing input device 100.

With continued reference to FIG. 2A and to FIG. 4B, in some embodiments, during a second capacitance measurement time period that does not overlap with the first capacitance measurement time period, merger module 305B couples a second subset of the first plurality of sensor electrodes (e.g., sensor electrodes 260) to the input channels 415 in a third configuration for acquiring capacitive resulting signals. In one embodiment, there are no common sensor electrodes in the second and third configurations. To accomplish this, merger module 305B: opens switches SW12, SW13, SW14, SW15, SW16, and SW17; closes SW1 and opens SW0 to couple sensor electrode 260-6 input channel 415-0; closes SW3 and opens SW2 to couple sensor electrode 260-7 with input channel 415-1; closes SW5 and opens SW4 to couple sensor electrode 260-8 with input channel 415-2; closes SW7 and opens SW6 to couple sensor electrode 260-9 with input channel 415-3; closes SW9 and opens SW8 to couple sensor electrode 260-10 with input channel 415-4; and closes SW11 and opens SW10 to couple sensor electrode 260-11 with input channel 415-5. In this manner, sensor electrodes from Group 2 are each individually coupled with a single input channel so that resulting signals can be acquired from all of the sensor electrodes of Group 2 during a single capacitance measurement time period. The resulting signals may be the result of one or more of absolute capacitive sensing and transcapacitive sensing. Resulting signals acquired during this second capacitance measurement time period are utilized by determination module 320 to determine positional information for an input object in a sensing region (associated with sensor electrode pattern 200) of capacitive sensing input device 100. In some embodiments, determination module 320 utilizes resulting signals from the first and second capacitance measurement time periods to determine the position information.

With continued reference to FIG. 2A and to FIG. 4B, in some embodiments, during a third capacitance measurement time period that does not overlap with the first and second capacitance measurement time periods, merger module 305B couples a second plurality of sensor electrodes (e.g., sensor electrodes 270) to the input channels 415 in a fourth configuration for acquiring capacitive resulting signals. In one embodiment, there are no common sensor electrodes in the second, third, and fourth configurations. To accomplish this, merger module 305B: opens switches SW0 through SW11; closes SW12 to couple sensor electrode 270-0 with input channel 415-0; closes SW13 to couple sensor electrode 270-1 with input channel 415-1; closes SW14 to couple sensor electrode 270-2 with input channel 415-2; closes SW15 to couple sensor electrode 270-3 with input channel 415-3; closes SW16 to couple sensor electrode 270-4 with input channel 415-4; and closes SW17 to couple sensor electrode 270-5 with input channel 415-5. In this manner, sensor electrodes from Group 3, which share no common electrodes with the sensor electrodes of Groups 1 and 2, are each individually coupled with a single input channel so that resulting signals can be acquired from all of the sensor electrodes of Group 3 during a single capacitance measurement time period. The resulting signals may be the result of one or more of absolute capacitive sensing and transcapacitive sensing. Resulting signals acquired during this third capacitance measurement time period are utilized by determination module 320 to determine positional information for an input object in a sensing region (associated with sensor electrode pattern 200) of capacitive sensing input device 100. In some embodiments, determination module 320 utilizes resulting signals from the first, second, and third capacitance measurement time periods to determine the position information.

In some embodiments, other combinations of sensor electrodes may be coupled with one or more input channels to accomplish noise sensing. For example, in one embodiment, merger module 305B closes SW12 and one or more of SW0 and SW1 such that one sensor electrode 270 and one or more sensor electrodes 260 are merged together and coupled with input channel 415-0. Merger module 305B can selectively accomplish similar mergers with respect to input channels 415-1 through 415-5. Any of the switch opening and closing techniques as described previously can be utilized when acquiring capacitive resulting signals at a separate time from accomplishing this noise sensing. In another embodiment, during noise sensing, merger module 305B closes switches SW12 through SW17 while opening switches SW1 through SW11 thus individually coupling sensor electrodes 270 to input channels 415. Any of the switch opening and closing techniques as described previously can be utilized when acquiring capacitive resulting signals at a separate time from accomplishing this noise sensing.

Figure 4C:
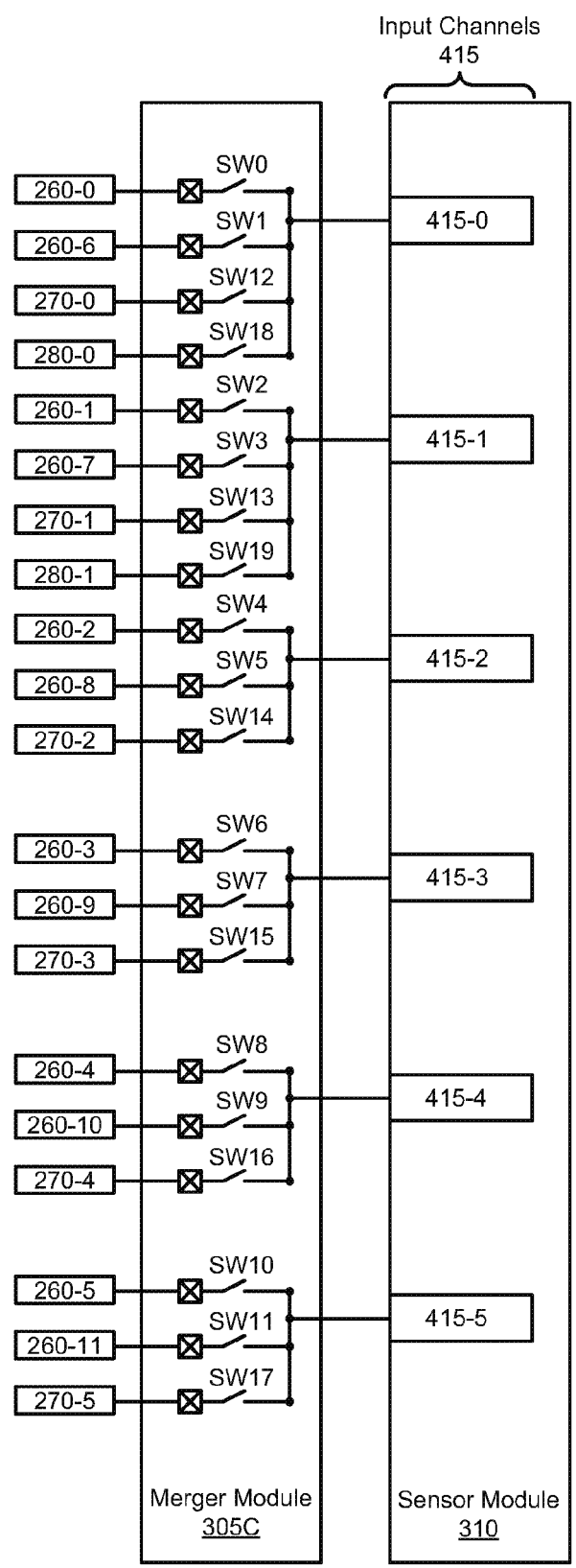
FIG. 4C illustrates a block diagram of a merger module of a processing system that is configured for coupling a sensor electrode pattern and associated side electrodes with input channels inputs of the processing system, according to various embodiments.

FIG. 4C illustrates a block diagram of a merger module 305C of a processing system 100A that is configured for coupling a sensor electrode pattern 200 and associated side electrodes 280 with input channels 415 of the processing system, according to various embodiments.

With reference to FIG. 2B and to FIG. 4C, during at least one noise measurement time period, merger module 305C couples a first plurality of sensor electrodes (e.g., sensor electrodes 260) to one or more input channels 415 of sensing module 310 in a first configuration for acquiring currents as a measurement of noise. To accomplish this first configuration, merger module 305C: closes switches SW0 and SW1 to respectively merge together and simultaneously couple sensor electrodes 260-0 and 260-6 with input channel 415-0; closes switches SW2 and SW3 to respectively merge together and simultaneously couple sensor electrodes 260-1 and 260-7 with input channel 415-1; closes switches SW4 and SW5 to respectively merge together and simultaneously couple sensor electrodes 260-2 and 260-8 with input channel 415-2; closes switches SW6 and SW7 to respectively merge together and simultaneously couple sensor electrodes 260-3 and 260-9 with input channel 415-3; closes switches SW8 and SW9 to respectively merge together and simultaneously couple sensor electrodes 260-4 and 260-10 with input channel 415-4; closes switches SW10 and SW11 to respectively merge together and simultaneously couple sensor electrodes 260-5 and 260-11 with input channel 415-5; and opens switches SW12, SW13, SW14, SW15, SW16, SW17, SW18 and SW19. In this manner, no side electrodes 280 and no sensor electrodes from Group are coupled with any input channels 415 while sensor electrodes from Group 1 and Group 2 are merged together so currents can be measured on all of the sensor electrodes from Groups 1 and 2 during a single noise measurement time period rather that utilizing two noise sensing time periods if only one sensor electrode had been coupled to an input channel at a time during noise measurement.

With continued reference to FIG. 2B and to FIG. 4C, in some embodiments, during a first capacitance measurement time period, merger module 305C couples a first subset of the first plurality of sensor electrodes (e.g., sensor electrodes 260) to the input channels 415 in a second configuration for acquiring capacitive resulting signals. To accomplish this, merger module 305C: opens switches SW12, SW13, SW14, SW15, SW16, SW17, SW18 and SW19; closes SW0 and opens SW1 to couple sensor electrode 260-0 with input channel 415-0; closes SW2 and opens SW3 to couple sensor electrode 260-1 with input channel 415-1; closes SW4 and opens SW5 to couple sensor electrode 260-2 with input channel 415-2; closes SW6 and opens SW7 to couple sensor electrode 260-3 with input channel 415-3; closes SW8 and opens SW9 to couple sensor electrode 260-4 with input channel 415-4; and closes SW10 and opens SW11 to couple sensor electrode 260-5 with input channel 415-5. In this manner, sensor electrodes from Group 1 are each individually coupled with a single input channel so that resulting signals can be acquired from all of the sensor electrodes of Group 1 during a single capacitance measurement time period. The resulting signals may be the result of one or more of absolute capacitive sensing and transcapacitive sensing. Resulting signals acquired during this first capacitance measurement time period are utilized by determination module 320 to determine positional information for an input object in a sensing region (associated with sensor electrode pattern 200) of capacitive sensing input device 100.

With continued reference to FIG. 2B and to FIG. 4C, in some embodiments, during a second capacitance measurement time period that does not overlap with the first capacitance measurement time period, merger module 305C couples a second and completely different subset of the first plurality (e.g., sensor electrodes 260) of sensor electrodes to the input channels 415 in a third configuration for acquiring capacitive resulting signals. In one embodiment, for example, there are no common sensor electrodes in the second and third configurations. To accomplish this, merger module 305C: opens switches SW12, SW13, SW14, SW15, SW16, SW17, SW18, and SW19; closes SW1 and opens SW0 to couple sensor electrode 260-6 input channel 415-0; closes SW3 and opens SW2 to couple sensor electrode 260-7 with input channel 415-1; closes SW5 and opens SW4 to couple sensor electrode 260-8 with input channel 415-2; closes SW7 and opens SW6 to couple sensor electrode 260-9 with input channel 415-3; closes SW9 and opens SW8 to couple sensor electrode 260-10 with input channel 415-4; and closes SW11 and opens SW10 to couple sensor electrode 260-11 with input channel 415-5. In this manner, sensor electrodes from Group 2 are each individually coupled with a single input channel so that resulting signals can be acquired from all of the sensor electrodes of Group 2 during a single capacitance measurement time period. The resulting signals may be the result of one or more of absolute capacitive sensing and transcapacitive sensing. Resulting signals acquired during this second capacitance measurement time period are utilized by determination module 320 to determine positional information for an input object in a sensing region (associated with sensor electrode pattern 200) of capacitive sensing input device 100. In some embodiments, determination module 320 utilizes resulting signals from the first and second capacitance measurement time periods to determine the position information.

With continued reference to FIG. 2B and to FIG. 4C, in some embodiments, during a third capacitance measurement time period that does not overlap with the first and second capacitance measurement time periods, merger module 305C couples a second plurality of sensor electrodes (e.g., sensor electrodes 270) to the input channels 415 in a fourth configuration for acquiring capacitive resulting signals. In one embodiment, there are no common sensor electrodes in the second, third, and fourth configurations. To accomplish this, merger module 305C: opens switches SW0 through SW11 and switches SW18 and SW19; closes SW12 to couple sensor electrode 270-0 with input channel 415-0; closes SW13 to couple sensor electrode 270-1 with input channel 415-1; closes SW14 to couple sensor electrode 270-2 with input channel 415-2; closes SW15 to couple sensor electrode 270-3 with input channel 415-3; closes SW16 to couple sensor electrode 270-4 with input channel 415-4; and closes SW17 to couple sensor electrode 270-5 with input channel 415-5. In this manner, sensor electrodes from Group 3, which share no common electrodes with the sensor electrodes of Groups 1 and 2, are each individually coupled with a single input channel so that resulting signals can be acquired from all of the sensor electrodes of Group 3 during a single capacitance measurement time period. The resulting signals may be the result of one or more of absolute capacitive sensing and transcapacitive sensing. Resulting signals acquired during this third capacitance measurement time period are utilized by determination module 320 to determine positional information for an input object in a sensing region (associated with sensor electrode pattern 200) of capacitive sensing input device 100. In some embodiments, determination module 320 utilizes resulting signals from the first, second, and third capacitance measurement time periods to determine the position information.

In some embodiments, other combinations of sensor electrodes may be coupled with one or more input channels to accomplish noise sensing. For example, in one embodiment, merger module 305C closes one or more of SW0 and SW1 and one or more of SW12 and SW18 such that at least one receiver electrode 260 and one or more of a transmitter electrode 270 and side electrode 280-0 are merged together and coupled with input channel 415-0. Merger module 305C can selectively accomplish similar mergers with respect to input channel 415-1 through 415-5 (noting that, in the depicted example, of these input channels only input channel 415-1 has the possibility of being coupled with a side electrode). Any of the switch opening and closing techniques as described previously can be utilized when acquiring capacitive resulting signals at a separate time from accomplishing this noise sensing. In another embodiment, during noise sensing, merger module 305C closes switches SW12 through SW17, SW18, and SW19 while opening switches SW1 through SW11 thus individually coupling sensor electrodes 270-2 through 270-5 respectively to input channels 415-2 through 415-5 while merging sensor electrode 270-0 and side electrode 280-0 onto input channel 415-0 and merging sensor electrode 270-1 and side electrode 280-1 onto input channel 415-1. Any of the switch opening and closing techniques as described previously can be utilized when acquiring capacitive resulting signals at a separate time from accomplishing this noise sensing.

Although only a limited number of examples have been illustrated in FIGS. 4A-4C it should be appreciated that the ultimate expression of this concept anticipates and envisions a merger module 305 which allows all sensor electrodes 260, all sensor electrodes 270, and all side electrodes 280 to be selectively coupled to any selected input channel (e.g., to input channel 415-0). It should further be appreciated, that when a plurality of sensor electrodes and/or side electrodes are coupled with single input channel (e.g., 415-0) to measure current during a noise measurement time period that: a) other input channels may be shut down or placed in a low power mode if not needed or being used in order to conserve power; and b) the analog amplifiers and other front end circuitry used for measuring current with the utilized input channel(s) should be properly sized to ensure that it is capable of measuring the merged current without becoming saturated or otherwise overwhelmed.

Example Methods of Operation

FIGS. 5A, 5B, 5C and 5D illustrate a flow diagram 500 of a method of capacitive sensing, according to various embodiments. Procedures of this method will be described with reference to elements and/or components of one or more of FIGS. 1-4C. It is appreciated that in some embodiments, the procedures may be performed in a different order than described, that some of the described procedures may not be performed, and/or that one or more additional procedures to those described may be performed.

With reference to FIG. 5A, at procedure 510 of flow diagram 500, in one embodiment, a first plurality of sensor electrodes of a sensor electrode pattern is coupled, in a first configuration, to input channels of a processing system, wherein the sensor electrode pattern is associated with a sensing region. With reference to FIGS. 2A and 4A, in some embodiments, this comprises merger module 305 of processing system 110A coupling one or more sensor electrodes 260 to input channels 415 in the first configuration by merging together Groups 1 and 2 of sensor electrodes 260 in order to couple all of the sensor electrodes simultaneously to input channels 415. As there are more sensor electrodes 260 than input channels 415, this means that at least one and as many as all input channels 415 are each coupled simultaneously with a plurality of sensor electrodes 260 (i.e., with two or more receiver electrodes). For example, this first configuration may comprise merger module 305 coupling at least two sensor electrodes 260 of the first plurality of sensor electrodes simultaneously to a single input channel 415, such as coupling sensor electrodes 260-0 and 260-6 simultaneously to input channel 415-0. With additional reference to FIGS. 2B, 4B, and 4C, in some embodiments, as part of this first configuration, merger module 305 simultaneously couple at least one sensor electrode 260 (i.e., a receiver electrode) to an input channel such as input channel 415-0 along with one or more types of electrodes such as one or more of a sensor electrode 270 (i.e., a transmitter electrode) and a side electrode 280.

With continued reference to FIG. 5A, at procedure 520 of flow diagram 500, in one embodiment, the first configuration of the first plurality sensor of electrodes is utilized to acquire a measurement of current. This measurement of current is accomplished while processing system 110A is not transmitting a signal on any of the sensor electrodes of sensor electrode pattern 200. The current is induced in the first configuration of sensor electrodes by noise in the operating environment of the sensor electrodes. The measurement of current is made by sensing module 310 in some embodiments. In some embodiments, sensing module 310 utilizes the same circuitry for measuring current as it also uses for measuring resulting signals during capacitive sensing.

With continued reference to FIG. 5A, at procedure 530 of flow diagram 500, in one embodiment, a noise environment is determined through analysis of the measurement of current. In some embodiments, determination module 320 makes this determination based, at least in part, on an amount of current that is measured. Determination module 320 can then alter, adjust, or direct sensing module 310 and merger module 305 to utilize a type or manner of capacitive sensing or a particular configuration of sensor electrodes for noise avoidance and/or to select a type of filtering/processing algorithms to utilize based on the noise environment that it determines to exist for the sensor electrodes.

With continued reference to FIG. 5A, at procedure 540 of flow diagram 500, in one embodiment, at least one subset of the first plurality of sensor electrodes is coupled, in a second configuration, to the input channels, wherein the second configuration and the first configuration are different. Merger module 305, in some embodiments, operates to couple at least a subset of the first plurality of sensor electrodes (e.g., sensor electrodes 260) to the input channels 415. This comprises coupling only a single sensor electrode with any utilized input channel 415 during the time period that capacitive sensing takes place. For example, and with reference to FIGS. 2A, 2B, 4A, 4B, and 4C, this can comprise merger module 305 closing appropriate switches to couple only the following sensor electrodes 260 of Group 1, and no other electrodes, to input channels 415: sensor electrode 260-0 to input channel 415-0; sensor electrode 260-1 to input channel 415-1; sensor electrode 260-2 to input channel 415-2; sensor electrode 260-3 input channel 415-3; sensor electrode 260-4 to input channel 415-4; and sensor electrode 260-5 to input channel 415-5.

With continued reference to FIG. 5A, at procedure 550 of flow diagram 500, in one embodiment, the second configuration of the first plurality of sensor electrodes is utilized to acquire capacitive resulting signals. In some embodiments, this comprises sensing module 310 acquiring these resulting signals and providing them to determination module 320. The acquired capacitive resulting signals may be acquired as a result of one or both of transcapacitive and absolute capacitive sensing.

With reference to FIG. 5B, as illustrated in procedure 560 of flow diagram 500, in some embodiments, the method as described in 510-550 further comprises determining a position of an input object with respect to the sensing region based on the capacitive resulting signals. In some embodiments, this comprises determination module 320 using the capacitive resulting signals to determine the position of an input object (e.g., input object 140) with respect to a sensing region 120 associated with a capacitive sensor pattern such as sensor electrode pattern 200. This may also comprise determination module 320 employing filtering or other processing algorithms to mitigate the noise that has been determined to exist in the operating environment of the sensor electrodes that are used for acquiring the capacitive resulting signals. This position determination may further involve the use of additional resulting signals from another subset of the sensor electrodes used to measure noise, such as from both Group 1 and Group 2 sensor electrodes, in some embodiments.

With reference to FIG. 5C, as illustrated in procedure 570 of flow diagram 500, in some embodiments, the method as described in 510-550 further comprises coupling a second subset of the first plurality of sensor electrodes of the sensor electrode pattern to the input channels, wherein the at least one subset of the first plurality of sensor electrodes and the second subset of the first plurality of sensor electrodes share no common sensor electrodes. At a separate time from sensor electrodes of Group 1, sensor electrodes 260-6 through 260-11 (i.e., Group 2) can be similarly coupled individually with input channels 415 to acquire capacitive resulting signals. It should be appreciated that, additionally or alternatively, other subsets of sensor electrodes 260 can similarly be coupled, in an individual manner, to one or more input channels 415 for the purpose of acquiring capacitive resulting signals. For example, in some embodiments, this comprises merger module 305 closing switches to couple only sensor electrodes of Group 2, in an individual manner (one sensor electrode per input channel), to input channels 415. For example, in some embodiments, this can comprise merger module 305 closing appropriate switches to couple only the following sensor electrodes 260 of Group 2, and no other electrodes, to input channels 415: sensor electrode 260-6 to input channel 415-0; sensor electrode 270-7 to input channel 415-1; sensor electrode 260-8 to input channel 415-2; sensor electrode 260-9 input channel 415-3; sensor electrode 260-10 to input channel 415-4; and sensor electrode 260-11 to input channel 415-5.

With continued reference to FIG. 5C, as illustrated in procedure 575 of flow diagram 500, in some embodiments, the method as described in 510-570 further comprises utilizing the second subset to acquire second capacitive resulting signals. In some embodiments, this comprises sensing module 310 acquiring these resulting signals and providing them to determination module 320. The acquired capacitive resulting signals may be acquired as a result of one or both of transcapacitive and absolute capacitive sensing.

In some embodiments, this further comprises determination module 320 using the capacitive resulting signals to determine the position of an input object (e.g., input object 140) with respect to a sensing region 120 associated with a capacitive sensor pattern such as sensor electrode pattern 200. The resulting signals from the second subset may be utilized with other resulting obtained from other sensor electrode configurations when determining position. For example, position determination, as described in 560 of FIG. 5B, may further involve the use of additional resulting signals from another subset of the sensor electrodes used to measure noise, such as from both Group 1 and Group 2 sensor electrodes, in some embodiments. This may also comprise determination module 320 employing filtering or other processing algorithms to mitigate the noise that has been determined to exist in the operating environment of the sensor electrodes that are used for acquiring the capacitive resulting signals.

With reference to FIG. 5D, as illustrated in procedure 580 of flow diagram 500, in some embodiments, the method as described in 510-550 further comprises coupling, in a third configuration, a second plurality of sensor electrodes of the sensor electrode pattern to the input channels, wherein the first plurality of sensor electrodes and the second plurality of sensor electrodes share no common sensor electrodes. For example, in some embodiments, this comprises merger module 305 closing switches to couple only sensor electrodes 270, in an individual manner (one sensor electrode per input channel), to input channels 415. For example, in some embodiments, this can comprise merger module 305 closing appropriate switches to couple only the following sensor electrodes 270 of Group 3, and no other electrodes, to input channels 415: sensor electrode 270-0 to input channel 415-0; sensor electrode 270-1 to input channel 415-1; sensor electrode 270-2 to input channel 415-2; sensor electrode 270-3 input channel 415-3; sensor electrode 270-4 to input channel 415-4; and sensor electrode 270-5 to input channel 415-5.

With continued reference to FIG. 5D, as illustrated in procedure 585 of flow diagram 500, in some embodiments, the method as described in 510-580 further comprises utilizing the third configuration to acquire second capacitive resulting signals. In some embodiments, this comprises sensing module 310 acquiring these resulting signals and providing them to determination module 320. The acquired capacitive resulting signals may be acquired as a result of one or both of transcapacitive and absolute capacitive sensing. In some embodiments, the first configuration may comprise coupling long axis electrodes to receiver channels. That is, the axis with fewer electrodes may be coupled to the receiver channels. This may be helpful when the short axis electrodes, or the axis of electrodes with a greater number of electrodes, is used in the second configuration and third configuration to acquire capacitive resulting signals. More generally, a first axis of electrodes may be used in configurations for determining noise while a second axis of electrodes may be used when determining input object location. This may be helpful when the number of first axis electrodes is less than or equal to the number of receiver channels, while the number of second axis electrodes if greater than the number of receiver channels. If it is decided that electrodes can be combined for noise determination, using the first axis electrodes can reduce processing time.

In some embodiments, this further comprises determination module 320 using the capacitive resulting signals to determine the position of an input object (e.g., input object 140) with respect to a sensing region 120 associated with a capacitive sensor pattern such as sensor electrode pattern 200. The resulting signals from the third configuration may be utilized with other resulting obtained from other sensor electrode configurations when determining position. This may also comprise determination module 320 employing filtering or other processing algorithms to mitigate the noise that has been determined to exist in the operating environment of the sensor electrodes that are used for acquiring the capacitive resulting signals.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

What is claimed is:

1. A method of capacitive sensing comprising:
   coupling, in a first configuration, a first plurality of sensor electrodes of a sensor electrode pattern to input channels of a processing system, wherein said sensor electrode pattern is associated with a sensing region, wherein said coupling the first plurality of sensor electrodes to said input channels of the processing system comprises:
   coupling at least two sensor electrodes of said first plurality of sensor electrodes simultaneously to a single input channel of said input channels to achieve said first configuration;
   utilizing said first configuration of said first plurality sensor of electrodes to acquire a measurement of current;
   determining a noise environment through analysis of said measurement of current;
   coupling, in a second configuration, at least one subset of said first plurality of sensor electrodes to said input channels, wherein said second configuration and said first configuration are different;
   utilizing said second configuration of said first plurality of sensor electrodes to acquire capacitive resulting signals; and
   determining, based on said capacitive resulting signals, a position of an input object with respect to said sensing region.

2. The method as recited in claim 1, further comprising:
   coupling a second subset of said first plurality of sensor electrodes of said sensor electrode pattern to said input channels, wherein said at least one subset of said first plurality of sensor electrodes and said second subset of said first plurality of sensor electrodes share no common sensor electrodes; and
   utilizing said second subset to acquire second capacitive resulting signals.

3. The method as recited in claim 1, further comprising:
   coupling, in a third configuration, a second plurality of sensor electrodes of said sensor electrode pattern to said input channels, wherein said first plurality of sensor electrodes and said second plurality of sensor electrodes share no common sensor electrodes; and utilizing said third configuration to acquire second capacitive resulting signals.

4. The method as recited in claim 3, further comprising: determining, based on said capacitive resulting signals and said second capacitive resulting signals, a position of an input object with respect to said sensing region.

5. The method as recited in claim 1, wherein said coupling at least two sensor electrodes of said first plurality of sensor electrodes simultaneously to said single input channel comprises:

coupling at least two receiver electrodes simultaneously to said single input channel of said input channels.

6. The method as recited in claim 1, wherein said coupling at least two sensor electrodes of said plurality of sensor electrodes simultaneously to said single input channel comprises:

coupling at least one receiver electrode and one other type of electrode simultaneously to said single input channel wherein said other type of electrode is selected from the group consisting of: transmitter electrodes and side electrodes.

7. The method as recited in claim 1, wherein said coupling, in said second configuration, said plurality of sensor electrodes to said input channels, comprises:

coupling only a single sensor electrode to any input channel of said input channels.

8. A processing system for a capacitive sensing input device, said processing system comprising:

a sensing module comprising a plurality of input channels, said sensing module configured to:
  acquire a measurement of current by operating a first plurality of sensor electrodes of a sensor electrode pattern of said capacitive sensing input device to receive noise signals; and
  acquire capacitive resulting signals by operating a sensor electrode of a sensor electrode pattern for capacitive sensing;

a merger module configured to:
  couple said first plurality of sensor electrodes to said input channels in a first configuration for acquiring said measurement of current, wherein said first configuration comprises coupling at least two sensor electrodes of said first plurality of sensor electrodes simultaneously to a single input channel of said input channels; and
  couple at least one subset of said first plurality of sensor electrodes to said input channels in a second configuration for acquiring said capacitive resulting signals; and a determination module configured to:
  determine a noise environment of said capacitive sensing input device through analysis of said measurement of current; and
  determine positional information for an input object in a sensing region of said capacitive sensing input device based on said capacitive resulting signals.

9. The processing system of claim 8, wherein said merger module is further configured to couple a second plurality of sensor electrodes of said sensor electrode pattern to said input channels in a third configuration, wherein said first plurality of sensor electrodes and said second plurality of sensor electrodes share no common sensor electrodes; and wherein said sensing module is further configured to utilize said third configuration to acquire second capacitive resulting signals.

10. The processing system of claim 9, wherein said determination module is further configured to determine positional information for said input object in said sensing region of said capacitive sensing input device based on said capacitive resulting signals and said second capacitive resulting signals.

11. The processing system of claim 8, wherein said at least two sensor electrodes comprise at least two receiver electrodes.

12. The processing system of claim 8, wherein said at least two sensor electrodes comprise at least one receiver electrode and one other type of electrode wherein said other type of electrode is selected from the group consisting of: transmitter electrodes and side electrodes.

13. The processing system of claim 8, wherein said first plurality of sensor electrodes comprises:

sensor electrodes disposed along an axis, of a pair of substantially orthogonally disposed axes, which has the greater number of sensor electrodes of the pair of axes.

14. The processing system of claim 8, wherein said coupling, in said second configuration, said plurality of sensor electrodes to said input channels, comprises:

coupling only a single sensor electrode to any input channel of said input channels.

15. The processing system of claim 8, wherein said merger module is configured to achieve said second configuration by:

coupling a first subset of said first plurality of sensor electrodes to said input channels during a first period of time; and coupling a second, completely different subset of said first plurality of sensor electrodes to said input channels during a second period of time, wherein said first period of time and said second period of time do not overlap.

16. A capacitive sensing input device, comprising:

a sensor electrode pattern associated with a sensing region; and a processing system configured to:
  couple, in a first configuration, a first plurality of sensor electrodes of said sensor electrode pattern to input channels of said processing system;
  couple at least two sensor electrodes of said first plurality of sensor electrodes simultaneously to a single input channel to achieve said first configuration;
  utilize said first configuration of said first plurality sensor of electrodes to acquire a measurement of current;
  determine a noise environment through analysis of said measurement of current;
  couple, in a second configuration, at least one subset of said first plurality of sensor electrodes to said input channels, wherein said second configuration and said first configuration are different;
  utilize said second configuration of sensor electrodes to acquire capacitive resulting signals; and
  determine, based on said capacitive resulting signals, a position of an input object with respect to said sensing region.

17. The capacitive sensing input device of claim 16, wherein said at least two sensor electrodes comprise:

at least two receiver electrodes.

18. The capacitive sensing input device of claim 16, wherein said at least two sensor electrodes comprise:

at least one receiver electrode and one other type of electrode wherein said other type of electrode is selected from the group consisting of: transmitter electrodes and side electrodes.

19. The capacitive sensing input device of claim 16, wherein said first plurality of sensor electrodes comprises:
sensor electrodes disposed along an axis, of a pair of substantially orthogonally disposed axes, which has the greater number of sensor electrodes of the pair of axes.

20. The capacitive sensing input device of claim 16, wherein said processing system is configured to:
couple only a single sensor electrode to any input channel of said input channels to achieve said second configuration.

21. The capacitive sensing input device of claim 16, wherein said processing system is configured to achieve said second configuration by:
coupling a first subset of said first plurality of sensor electrodes to said input channels during a first period of time; and
coupling a second, completely different subset of said first plurality of sensor electrodes to said input channels during a second period of time, wherein said first period of time and said second period of time do not overlap.

* * * * *